Figure 1:
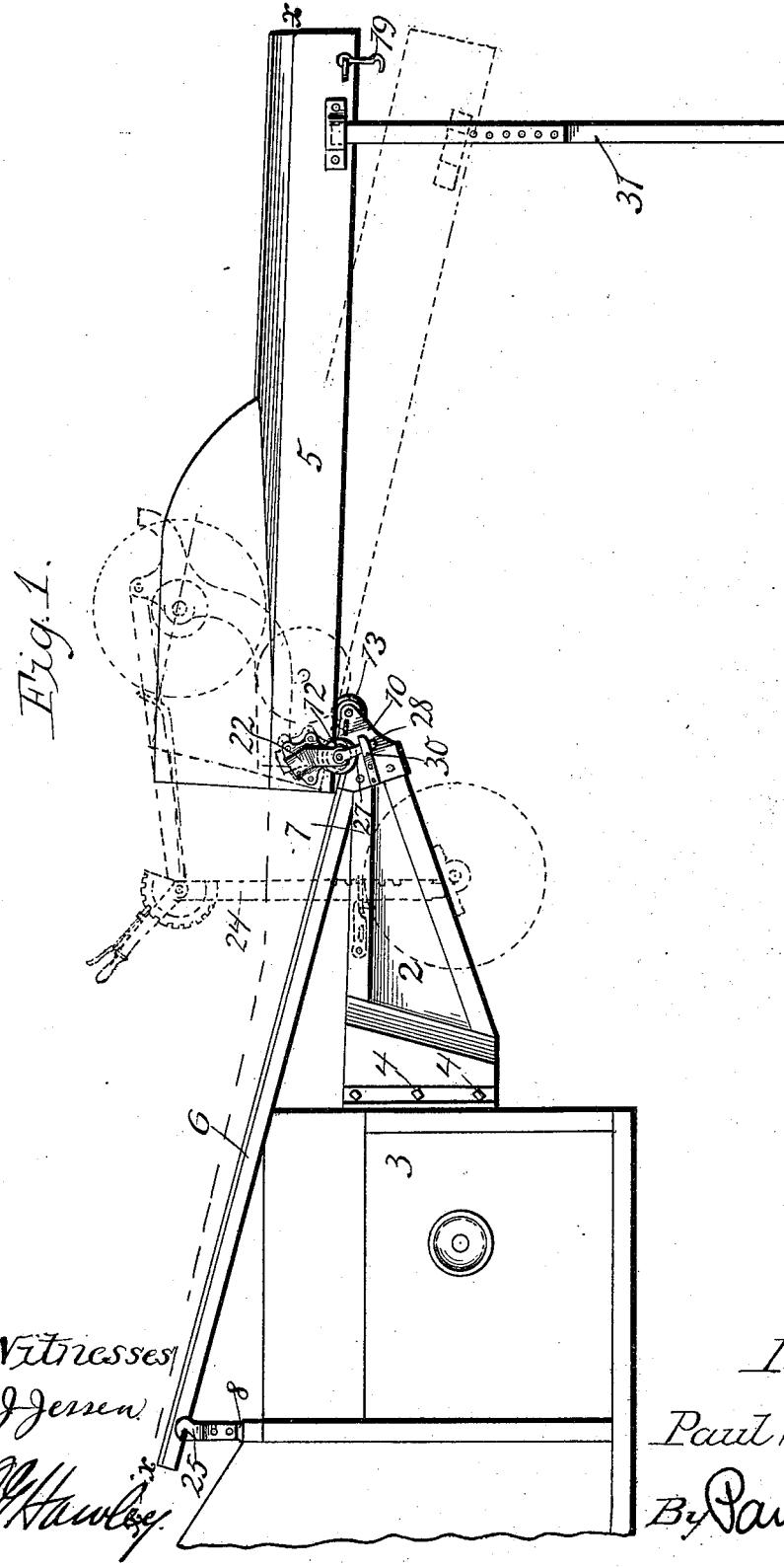

(No Model.) 3 Sheets—Sheet 1.
P. SWENSON.
BAND CUTTER AND FEEDER.

No. 470,265. Patented Mar. 8, 1892.

Witnesses
J Jensen
O H Hawley

Inventor
Paul Swenson
By Paul D Mermin
Attorneys (No Model.) 3 Sheets—Sheet 2.
P. SWENSON.
BAND CUTTER AND FEEDER.
No. 470,265. Patented Mar. 8, 1892.
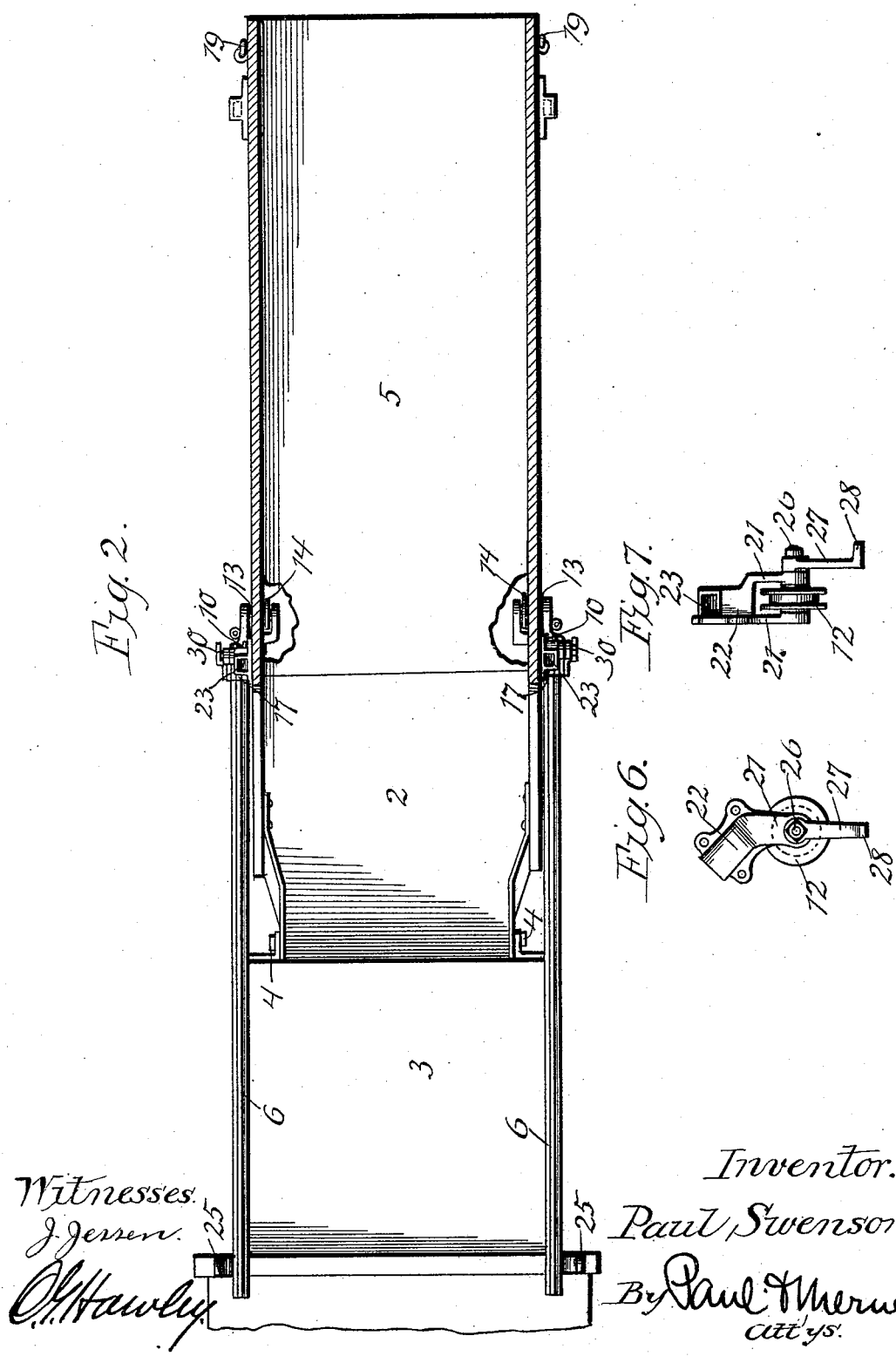

(No Model.) 3 Sheets—Sheet 3.
P. SWENSON.
BAND CUTTER AND FEEDER.
No. 470,265. Patented Mar. 8, 1892.
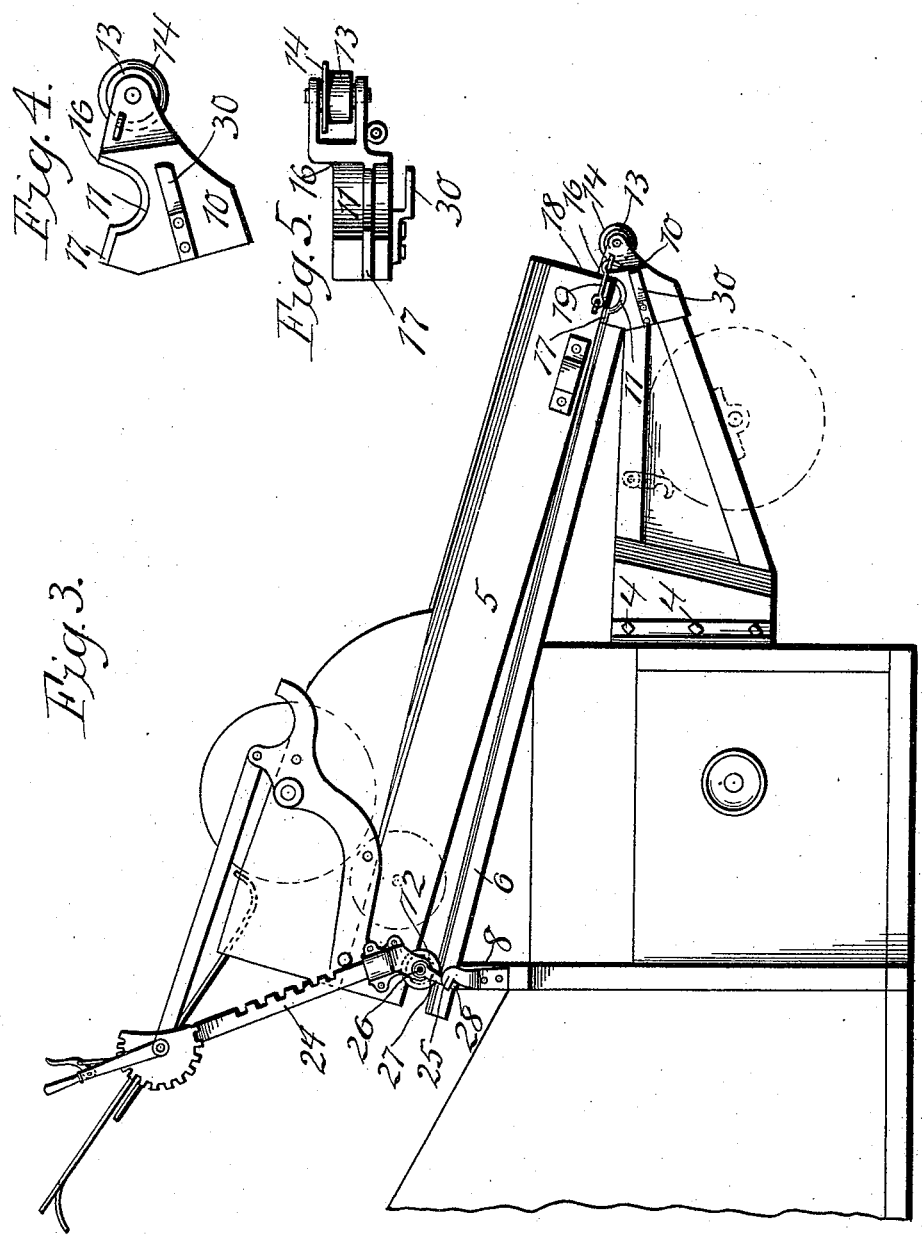

UNITED STATES PATENT OFFICE.

PAUL SWENSON, OF HOPKINS, MINNESOTA.

BAND-CUTTER AND FEEDER.

SPECIFICATION forming part of Letters Patent No. 470,265, dated March 8, 1892.

Application filed May 5, 1891. Serial No. 391,701. (No model.)

*To all whom it may concern:*

Be it known that I, PAUL SWENSON, of Hopkins, in the county of Hennepin and State of Minnesota, have invented certain new and useful Improvements in Band-Cutters and Feeders, of which the following is a specification.

Heretofore combined band-cutters and feeders have been very unwieldy to move from place to place, owing to the great difficulty and delay in connecting, disconnecting, and loading them for transportation.

The object of this invention is, therefore, to facilitate connecting and disconnecting a combined band-cutter and feeder for thrashing-machines and for loading and securing a band-cutter on top of a thrashing-machine when being moved from place to place and when not in use, and thereby overcoming the present difficulties and saving a great deal of time and labor when preparing to move.

By using the appliances hereinafter described and referred to, and which I claim to have invented, a proper, safe, and secure place is made for the band-cutter on top of the machine and one man can load the band-cutter in its place in less time and more easily than six men can by using any device heretofore devised.

My invention consists in the combination, with the feeder, of a track leading backwardly from the outer end thereof and projecting over the top or deck of the separator, and means for fastening the inner end of the band-cutter thereon in either its working position or when pushed up upon said track in its loaded position, and, further, in various constructions and in combinations, all as hereinafter described, and particularly pointed out in the claims.

My invention will be more readily understood by reference to the accompanying drawings, in which—

Figure 1 is a side elevation of a band-cutter and feeder embodying my invention. Fig. 2 is a plan view thereof below the plane of section line *x x*, Fig. 1. Fig. 3 is a side elevation showing the band-cutter loaded upon the top of the feeder and deck of the separator. Fig. 4 is a detail showing the casting wherein the roller is secured upon the end of the feeder. Fig. 5 is a plan view of said casting. Fig. 6 is a detail detached view of the casting, wherein the roller is secured upon the inner end of the band-cutter box. Fig. 7 is a view of the same from the inside.

As shown in the drawings, the feeder 2 is secured upon the receiving end 3 of the separator by means of the bolts 4. This feeder may be of any form and has the usual slanting bottom, down over which the grain is fed into the cylinder of the thrashing-machine. This portion is permanently secured upon the separator; but there is another portion—namely, the band-cutter box 5—which is made detachable therefrom. This part has its inner end fastened upon the outer end of the feeder box or frame when the device is in use. As ordinarily constructed the band-cutter box must be disconnected from the feeder and lifted bodily upon the top of the separator for transportation or placed in a separate vehicle. It is to avoid this heavy lifting and the waste of time that I have devised a more convenient mode of disposing of the band-cutter. For this purpose I provide on each side of the machine a track rail or bar 6, the outer end of which is secured upon the top rail 7 of the feeder-frame, while the inner end of each bar is securely fastened upon the deck of the separator, as by the vertical bracket 8 shown. Now it will be seen that as this track extends from the very outer end of the feeder and from a point directly beneath the inner end of the band-cutter the band-cutter may, after removing the supports for its outer end, be pushed directly back over the feeder and the end of the separator; or it will be seen that if the feeder were as long as the cutter-box, the latter would be lodged over the feeder only and would not project over the separator. Ordinarily, however, the proportions of the two are about as indicated in the drawings.

To make the loading of the band-cutter still easier, I arrange a pair of rollers on the outer end of the feeder and another pair on the inner end of the band-cutter box or trough, the latter being adapted to run upon the track and the former to support the feeder-box. The inner end of the track is preferably elevated, as shown, and the lower end thereof is merged with the outer ends of the feeder-frame into the castings 10, secured thereon, each provided with the recess or depression 11, wherein the roller 12 of the band-cutter box may rest when the same is in condition for use.

Each casting 10 is provided with outwardly-projecting lugs, between which the pulleys 13 are arranged, which pulleys are in line with and are adapted to support the sides of the band-cutter. The inner sides of the pulleys are provided with the flanges 14, whereby the band-cutter is prevented from slipping sidewise. As shown, the shoulder 16 of each casting 10 extends above the inclined surface 17, corresponding to the top of the rail 6, so that when the band-cutter 5 is loaded the outer end 18 thereof will rest against the shoulder 16, and be thus prevented from slipping off. An additional fastening is provided in the hooks 19, which are hooked into eyes provided on the parts 10. The other pair of pulleys or rollers 12 are secured between the depending arms 21 of the castings 22, which are secured upon the sides of the part 5. The upper portion of this casting is arranged at an obtuse angle with the depending portion thereof, and is provided with the recess or hole 23 in its top adapted to receive the lower end of the rack-bar 24, as shown in Fig. 3, which rack-bar forms a part of and is loaded with the band-cutter.

Upon the brackets or posts 8 I provide the hooks 25, and upon the studs 26 of the pulleys 12 I provide the pivoted hooks 27, having the ends 28, adapted to be secured beneath those 25, whereby the upper end of the band-cutter is prevented from dropping or sliding off the track while in the position shown in Fig. 3, while in the other position (that shown in Fig. 1) these hooks 27 are thrown down into engagement with the stationary lugs 30, provided on the feeder, thereby holding the rollers 12 firmly in the depression arranged at the lower ends 10 of the rails 6. In order that the rollers 12 may sink into these depressions, it is necessary to raise the outer end of the band-cutter into a substantially horizontal position, in which position it is supported by pins 31. On removing these pins and dropping the end of the band-cutter into the dotted position of Fig. 1, the rollers 12 are raised out of the depressions and into line with the tops of the rails. The feeder may now be shoved up upon the track, the forward end of the part 5 rolling on the pulleys 12 and the rear end thereof being supported by the rollers 13 and the castings 10. As the band-cutter reaches the full height, the lower end thereof drops in in front of the shoulders on the castings 10, and the band-cutter is thus prevented from sliding down off the rails.

It is obvious that the spirit of my invention being broadly the combination of rails with the feeder, whereby the band-cutter and conveyer box or trough may be loaded upon the top of the feeder, the detail construction shown in the drawings may be modified to a considerable degree without forming a departure from my invention, and I therefore do not confine myself to the specific construction shown and described.

Having thus described my invention, I claim as new and desire to secure by Letters Patent—

1. The combination, with the separator, of the feeder secured upon the receiving end thereof and opposite its receiving-opening, a band-cutter and conveyer-box having an inner end adapted to be secured upon the outer end of said feeder, and a track extending backwardly from the outer end of said feeder, and said band-cutter and conveyer adapted to be pushed back and lodged upon said track above said feeder, substantially as described.

2. The combination, with the separator, of the feeder secured upon the receiving end thereof and opposite its receiving-opening, a band-cutter box having an inner end adapted to be secured upon the outer end of said feeder, and a track extending backwardly from the outer end of said feeder and over the end of said separator and secured thereon, and said band-cutter box adapted to be pushed back and lodged upon said track above said feeder, substantially as described.

3. The combination, with the separator, of the feeder secured upon the receiving end thereof, a part 5, having an inner end adapted to be secured upon the outer end of said feeder, a projection or projections arranged on said outer end of the feeder, a track extending up from said outer end and projecting back over said feeder, depending projections arranged on the said inner end of the part 5, and depressions in the ends of the feeder, wherein the same are adapted to be secured, all substantially as and for the purpose specified.

4. The combination, with the thrashing-machine frame and a feeder-frame provided with rollers 13, of rails or bars 6 6, mounted upon the top of the machine-frame and formed at their lower ends with depressions, whereby the feeder-frame when out of use may be run up on the thrasher-frame or held in operative position, substantially as described.

5. The combination, with the thrashing-machine, of the band-cutter and feeder adapted to be attached thereto, rails or bars arranged on the top of the said thrashing-machine and having their outer ends arranged beneath the inner end of said band-cutter and feeder, depressions and shoulders on the outer ends of said rails, and projections on the inner end of said band-cutter and feeder device to engage the same and be thereby held in operative position, substantially as and for the purpose specified.

6. The combination, with the receiving end of a thrashing-machine, of the feeder device secured thereon, the band-cutter device having its inner end detachably fastened to the outer end of said feeder device, and rails projecting from said outer end back over the thrashing-machine and whereon said band-cutter device is adapted to be loaded and locked, substantially as described.

7. The combination, with the feeder, of the rails 6, secured thereon and extending backwardly therefrom, rollers 13, provided on said feeder, the band-cutter 5, means for supporting the rear end thereof when in operative position, rollers 12, arranged upon the inner end of said part 5 and adapted to travel upon said rails, and means for securing said band-cutter upon said rails and above said feeder, substantially as described.

8. The combination, with the feeder, of rolls 13, arranged thereon, rails 6, extending from the outer end thereof backwardly over the separator, depressions formed at the outer ends of said rails, the part 5, rollers or pulleys 12, arranged thereon and adapted to rest in said depressions, shoulders provided on the ends of said feeder-frame, lugs provided at the outer ends of said rails, other lugs provided at the inner ends of said rails, and the swinging hooks 27, arranged on the part 5 and adapted to engage said lugs when said part 5 is in its operative and loaded positions, respectively, substantially as described.

PAUL SWENSON.

Witnesses:
JOHN S. McDONALD,
A. J. ALLEY.